United States Patent

[11] 3,614,302

[72] Inventor Abraham A. Goldberg
Stamford, Conn.

[21] Appl. No. 856,334
[22] Filed Sept. 9, 1969
[45] Patented Oct. 19, 1971
[73] Assignee Columbia Broadcasting System, Inc.

[54] APPARATUS FOR RECORDING COLOR INFORMATION ON MONOCHROME FILM
6 Claims, 9 Drawing Figs.

[52] U.S. Cl. .......... 178/5.2 R, 178/5.4 CD, 178/6.6 A
[51] Int. Cl. .......... H04n 1/46, H04n 9/02
[50] Field of Search .......... 178/5.4 CD, 5.2 A, 5.2, 6.6 A

[56] References Cited

UNITED STATES PATENTS 3,475,549 10/1969 Goldmark et al. .......... 178/5.2

*Primary Examiner*—Richard Murray
*Assistant Examiner*—P. M. Pecori
*Attorney*—Spencer E. Olson

ABSTRACT: In apparatus for recording color picture information on monochrome film as two simultaneous sets of pictures, one for luminance information which may be in pictorial form, and the other for chroma information which takes the form of two color difference signals, suppressed carrier modulated in quadrature phase to each other and to which a pilot signal is added to facilitate playback, the available dynamic range of the film on which the information is recorded is better utilized by adding to the chroma signal, prior to recording, a signal corresponding to the NTSC "I" signal to make more symmetrical the chroma signal resulting from the vector addition of chroma and pilot.

INVENTOR.
ABRAHAM A. GOLDBERG
BY Spencer E. Olson
ATTORNEY

INVENTOR.
ABRAHAM A. GOLDBERG
BY
Spencer E. Olson
ATTORNEY

INVENTOR.
ABRAHAM A. GOLDBERG
BY Spencer E. Olson
ATTORNEY

INVENTOR.
ABRAHAM A. GOLDBERG
BY Spencer E. Olson
ATTORNEY

APPARATUS FOR RECORDING COLOR INFORMATION ON MONOCHROME FILM

BACKGROUND OF THE INVENTION

This invention relates to electronic techniques and apparatus for recording color picture information in monochrome on a record medium and for reproducing said information in a simple yet highly effective manner. More specifically, it relates to a technique for improving the quality of the information reproduced by apparatus of the kind described in copending application Ser. No. 862,564, filed July 25, 1969, now abandoned in favor of continuation application Ser. No. 61,424filed Aug. 5, 1970, entitled "Color Film Recording and Reproducing Apparatus" and assigned to the assignee of the present application.

In the system described therein, picture brightness information and picture color information are recorded on separate areas on a record medium, preferably with picture brightness information and picture color information recorded in separate adjacent portions of the same frame. The luminance information may be in pictorial form and recorded either optically or electronically by a recording beam, and the color information is recorded as a suppressed carrier signal component modulated in amplitude and phase according to the color saturation and hue in the original scene, and a superimposed reference carrier signal component bearing a fixed frequency relation to the color carrier signal so that the recorded cycles of the respective carriers tend to be aligned in a common direction on the record medium. Recording may be carried out by a scanning laser, electron beam or optical beam, as desired. The resulting record may be reproduced by directing an image of respective ones of the frame portions to separate television cameras for producing a luminance signal and other signals at the color and reference carrier frequencies.

An embodiment of such apparatus designed to produce a motion picture record comprises any suitable, high-resolution color television camera capable of translating the color picture information contained in a conventional color motion picture into signals representing, respectively, the brightness and the color information in the picture. Typically, the brightness information may be represented by the NTSC "Y" signal, and the color information by the NTSC "I" and "Q" signals. The "I" and "Q" signals are used to modulate a carrier signal, which may have a frequency of 1.8 MHz., in a suppressed carrier modulator, to produce modulated carrier sidebands 0.5 MHz., wide, varying in phase and amplitude in accordance with the hue and saturation, respectively. The modulation sidebands, to which a pilot signal having a frequency one-half that of the subcarrier, or 0.9 MHz., are recorded on monochrome film which is then processed in the conventional manner to produce a release print for use in subsequent reproducing operations.

Apparatus for reproducing the monochrome color picture record may comprise a flying spot scanner for separately scanning the adjacent portions of each frame respectively carrying the brightness and the color information. From the former is derived a brightness signal which may be the conventional "Y" signal of the NTSC system, and from the recorded color information are obtained the color modulation sidebands and the pilot signal. The pilot signal is used to restore the color carrier which, in turn, is employed to demodulate the color sidebands. From the demodulated sidebands are obtained color information representing signals which may be the conventional color difference signals R–Y, G–Y and B–Y, for example. By adding the "Y" signal to the several color difference signals, signals R, B and G representative of the color information in the picture are produced for reproduction by a monitor or for utilization in broadcast transmission.

Of particular significance to the present invention, is the fact that in the above-described system the pilot signal added to the carrier sidebands has a frequency precisely one-half that of the subcarrier. It is well known that when two signals related two to one in frequency are linearly added to each other, the resultant complex waveform has excursions that are symmetrical or unsymmetrical about an average axis depending on the phase relationship of the two signals. If such symmetrical and unsymmetrical wave forms are sequentially recorded on film as density variations from black to white, the signal average would be centered on midgray with the positive excursions recorded toward high-film transmission (white) and the negative excursions toward low-film transmission (black). If the overall peak-to-peak excursions of these two wave forms encompass the entire linear dynamic range of the film, it follows that the individual signals separately occupy less than the full dynamic range of the film. The invention enables better utilization of the available dynamic range of monochrome film and greater modulation in the chroma-pilot pictures can be achieved with a concomitant improvement in signal-to-noise ratio in the reproduced picture.

SUMMARY OF THE INVENTION

Accordingly, it is a principal object of the present invention to improve the quality of color pictures reproduced from coded information recorded on monochrome film.

A more specific object of the invention is to better utilize the available dynamic range of monochrome film in recording color picture information signals thereon.

Briefly, these and other objects of the invention are achieved by adding to the asymmetrical signal resulting from the vector addition of the chroma and pilot signals a low-frequency pedestal signal of the correct polarity and amplitude to make the wave form more symmetrical so as to occupy essentially the total available dynamic range of the film on which the signals are recorded. Specifically, by making the correcting pedestal signal equal to "–I," the waveform resulting from the addition has symmetrical peak excursions and occupies approximately 15 percent less dynamic range than when the correcting signal is not added. The thus-corrected signal is used to modulate an electron beam recorder to record the master film from which release prints are made by contact printing. In the reproducer, in which the chroma pictures are scanned independently of the luminance pictures of the film, the chroma plus pilot plus "–I" signal is applied to a suitable translator which ignores the "–I" signal and utilizes only the chroma plus pilot signals to present the color information.

DESCRIPTION OF THE DRAWING

For a better understanding of the invention, reference is made to the following detailed description of a typical embodiment, taken in conjunction with the accompanying drawing, in which.

DESCRIPTION OF THE PREFERRED EMBODIMENT

Figures 1, 2:
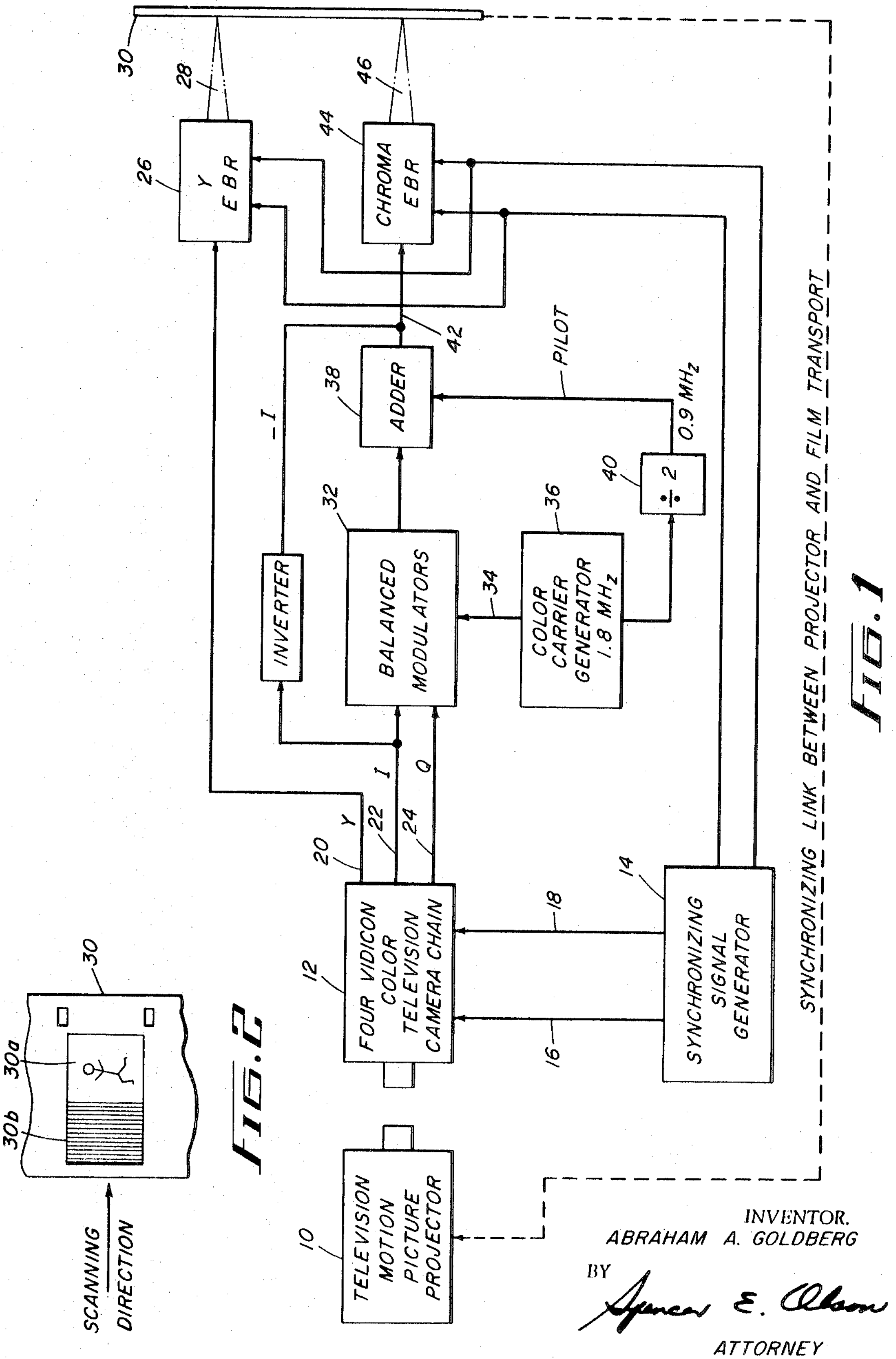
FIG. 1 is a schematic diagram of the recording system described in the aforementioned application.
FIG. 2 illustrates one form of color picture information record produced by the system of FIG. 1.

A monochrome color film record of the type shown in FIG. 2 (to which further reference will be made later) may be produced by the recording apparatus shown in FIG. 1. It comprises a conventional motion picture film projector 10 disposed to project a motion picture image in color to the sensitive elements of a conventional high-resolution four-Vidicon color television camera chain 12. Suitable composite synchronizing and blanking signals may be supplied to the camera chain from a conventional synchronizing signal generator 14 over the conductors 16 and 18. As is known, the color camera chain 12 provides color information representing signals at output conductors 20, 22 and 24 which, in accordance with current practice in the United States, are the so-called Y, I and Q signals, as defined by the National Television Standards Committee (NTSC).

The "Y" or brightness signal from the camera chain is supplied to the intensity control electrode of an electron beam recorder 26 which also receives blanking and horizontal and vertical deflection signals from the synchronizing signal generator 14. The electron beam 28 from the electron beam recorder 26 is focused upon an ultrafine grain monochrome film 30 contained in a suitable vacuum environment transport (not shown) operated in synchronism with the motion picture projector 10 by conventional means also not shown. The beam deflection in the electron beam recorder 26, land the transport for the film 30 are so arranged that the "Y" or brightness information is recorded in the frame portion 30*a* of the film shown in FIG. 2.

The "I" and "Q" signals from the camera chain 12 are supplied over conductors 22 and 24 to a pair of balanced modulators, represented by the single block 32, which also receive as second inputs over a conductor 34 and color carrier signal in the correct phase from a signal generator 36 which, in a satisfactorily operable system has a frequency of 1.8 MHz. The outputs of the modulators 32 are combined in a known manner such that only the modulation sidebands appear in the output, the carrier amplitude being zero when the modulation input is zero. The modulation sidebands of the color carrier signal are applied to an adder circuit 38 to which is applied as a second input a pilot signal of the correct phase having a frequency one-half that of the color carrier signal, or 0.9 MHz., which is conveniently derived by dividing the frequency of the signal from signal generator 36 by two in a suitable divider circuit 40.

The sum of the modulation sidebands and the pilot carrier signal are supplied from the adder 38 over a conductor 42 to modulate the beam intensity of an electron beam recorder 44, the electron beam 46 from which is directed onto the film 30.

The spot deflection direction in the electron beam recorder, is suitably disposed to record on frame portion 30*b* (FIG. 2) color information in the form of a succession of parallel lines extending longitudinally of the film 30 and spaced transversely thereof, each line comprising a record of the modulation sidebands of the suppressed color carrier modulated as a function of the color information in the picture. Also recorded in each line is the pilot signal which is subsequently utilized during playback to reconstruct a carrier for extraction of the color information contained in the color modulation sidebands.

In operation of the system shown in FIG. 1, a standard color motion picture film is installed in the projector 10, and a 16 mm. ultrafine grain monochrome unexposed film in the transport receives the beams 28 and 46 from the electron beam recorders 26 and 44. The projector 10 and the transport are operated in synchronism at a suitable rate, for example, 48 frames per second, and the camera chain 12 likewise is also operating at a rate of 48 frames per second and the camera chain 12 likewise is also operating at a rate of 48 frames per second in synchronism with the projector 10. The recorders 26 and 44 being so arranged that the film record format of FIG. 2 is obtained, a succession of frames each comprising a portion 30*a* carrying brightness picture information and an adjacent portion 30*b* carrying coded color information are recorded on the film 30. After the film has been exposed, it may be processed in the usual manner and the negative thus produced utilized to provide as many positive release prints as may be required.

Figure 3:
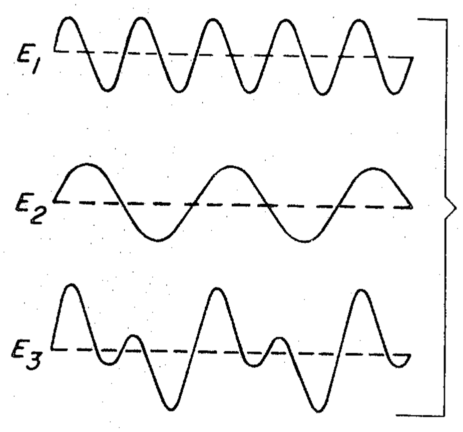
FIGS. 3 and 4 illustrate the waveforms resulting from the linear addition of two signals related two to one in frequency for two different phase relationships between the signals.
Figure 4:
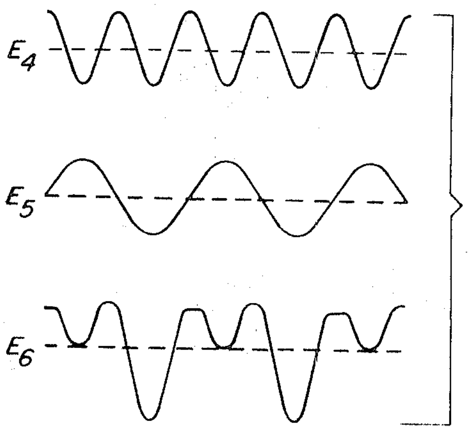

While the use of a pilot signal frequency one-half that of the color carrier frequency, both of which are multiples of the line scanning rate, causes the recorded information to form a succession of parallel lines extending longitudinally of the film as shown in FIG. 2, the addition of the 0.9 MHz. pilot signal to the color difference signal produced in the modulators results in a complex waveform having excursions that are symmetrical or unsymmetrical about an average axis, depending on the phase relationship of these signals, which, in turn, limits utilization of the full available dynamic range of the film on which the chroma signals are ultimately recorded. As shown in FIG. 3, when a signal $E_1$ having a frequency twice that of a second signal $E_2$, and having the illustrated phase relationship, are linearly added together, the complex waveform $E_3$, having symmetrical excursions about an average axis results. However, as shown in FIG. 4, when the higher frequency signal, $E_1$, is shifted 90° relative to the phase relationship shown in FIG. 3, and the two signals linearly added together, the resulting waveform $E_6$ is unsymmetrical about the average axis (which does not change because the areas above and below the curve are equal) having negative-going peaks twice the amplitude of the positive-going excursions.

Figure 5:
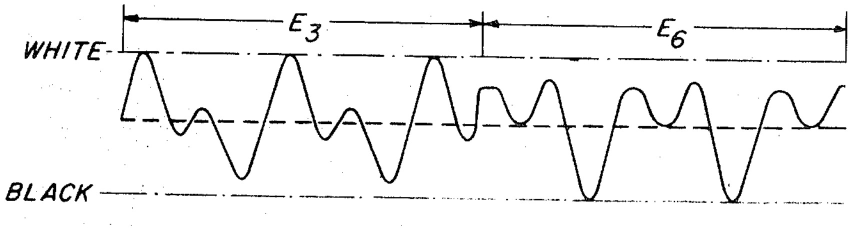
FIGS. 5 and 6 are schematic representations of signal amplitude vs. film dynamic range useful in explaining the efficacy of the invention.

If now the signals $E_3$ and $E_6$ were sequentially recorded on film as density variations from black to white, as shown in FIG. 5, the signal average would be centered on midgray with the positive excursions recorded toward high-film transmission (white) and the negative excursions toward low-film transmission (black). Letting the peak-to-peak excursions of the two signals fill 100 percent of the linear dynamic range of the film between black and white, represented by the dot-dash lines, it will be observed that the signals $E_3$ and $E_6$ each individually occupy only approximately 85 percent of the range. Stated another way, because of the likelihood of occurrence in the output of adder 38 of both symmetrical and unsymmetrical signals of the form simply illustrated in FIG. 5, it is necessary to assure acceptable recording of both types of signals to utilize less than the available dynamic range for the recording of either one. This has the effect of limiting the depth of modulation in the chroma-pilot pictures recorded on the film 30 with an attendant degradation in signal-to-noise ratio in the reproduced picture.

Figure 6:
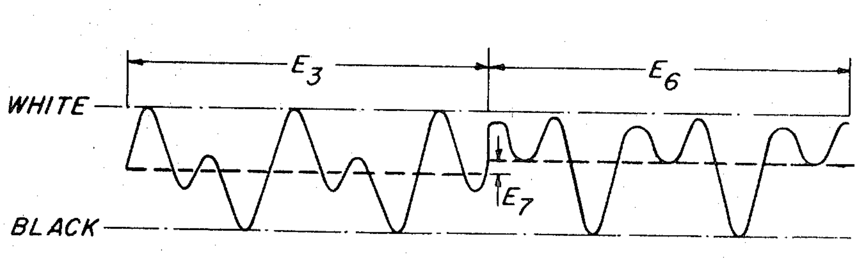

In accordance with the present invention there is added to the complex signal a pedestal signal of proper polarity and amplitude to raise the positive-going peaks of the unsymmetrical signal to the level of the positive-going peaks of the symmetrical signal, which results in the negative-going excursions of the unsymmetrical signal being at the same level as the negative-going excursions of the symmetrical wave. This is schematically shown in FIG. 6 where the average level of signal $E_6$ is raised by the amount $E_7$, causing the signals $E_3$ and $E_6$ each to occupy 100 of the dynamic range of the film.

The principle just outlined is employed in the system of FIG. 1 to extend the utilization of the dynamic range of the film 30 by adding to the chroma plus pilot signals from adder 38 a low-frequency pedestal signal of correct polarity and amplitude to equalize the positive and negative excursions of this inherently unsymmetrical composite signal. As dramatically shown in FIG. 7, the encoded chroma plus pilot signal waveform representative of color bars is asymmetrical to a greater or lesser degree for each color due to the varying phase relationship of the chroma to the fixed frequency pilot signal. The pilot signal alone can be seen in the white bar because the chroma signal goes to zero during white.

Figure 7:
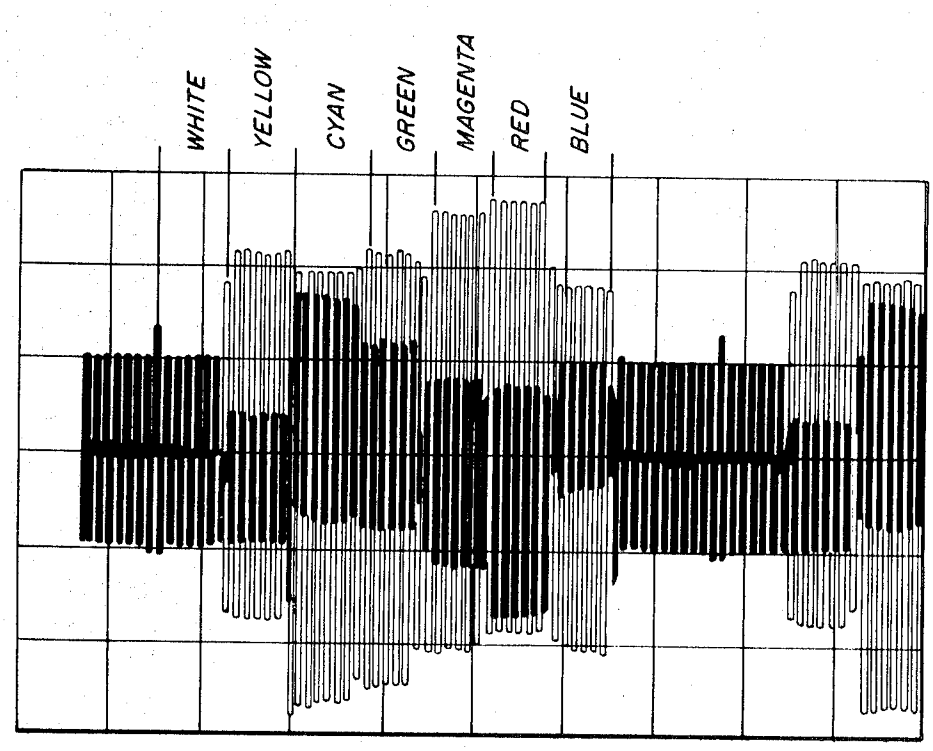
FIG. 7 is a reproduction of an oscilloscope trace of the chroma plus pilot signal derived from the adder of the system of FIG. 1 when the pedestal signal is absent.
Figure 8:
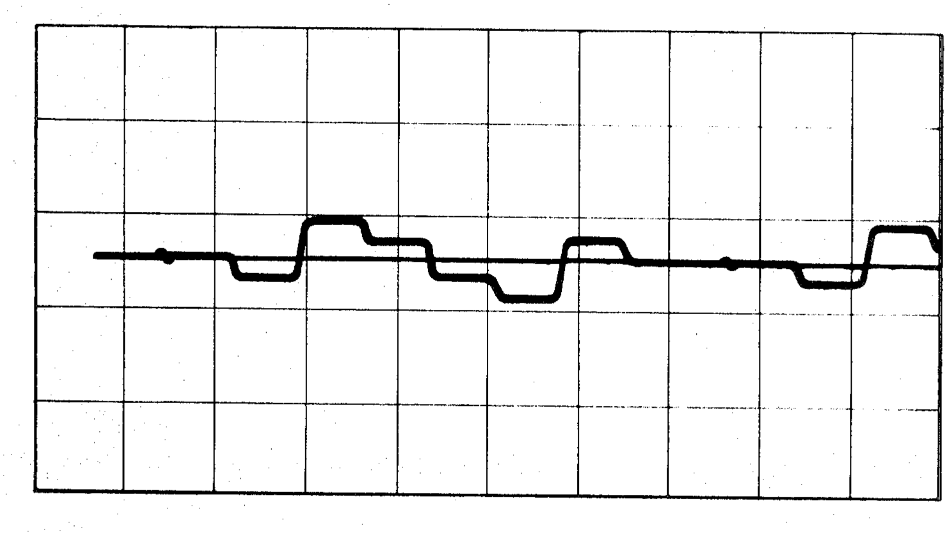
FIG. 8 is a reproduction of an oscilloscope trace showing the shape of the pedestal signal.

Applicant has recognized that the positive and negative-going excursions of the waveform of FIG. 7 (which will be recognized as a special case) can be made symmetrical about an average value by adding to the chroma plus pilot signal a signal corresponding to the inverse of the "I" signal appearing at the output of the camera chain 12, or "−I." This signal, shown in FIG. 8, for the color bar information illustrated in FIG. 7, is obtained by simply inverting the signal appearing on conductor 22 in a suitable inverter 48 and adding it to the complex signal appearing at the output of adder 38. The signal resulting from this addition, illustrated in FIG. 9, has symmetrical peak excursions and occupies approximately 15 percent less dynamic range than the signal of FIG 7. Provision of the pedestal signal, then, permits greater amplification of the complex signals to fully utilize the available dynamic range of the film 30, an improvement of 15 percent, to give greater modulation in the chroma-pilot pictures recorded on the film and an attendant improvement in signal-to-noise ratio in the reproduced picture.

Although the "–I" signal of FIG. 8 chosen for illustrating the invention is of regular shape due to the controlled nature of the chroma signals illustrated in FIG. 7, tests have shown that the "–I" signal derived from complex color scenes similarly equalizes the positive and negative excursions of the chroma plus pilot signal.

Figure 9:
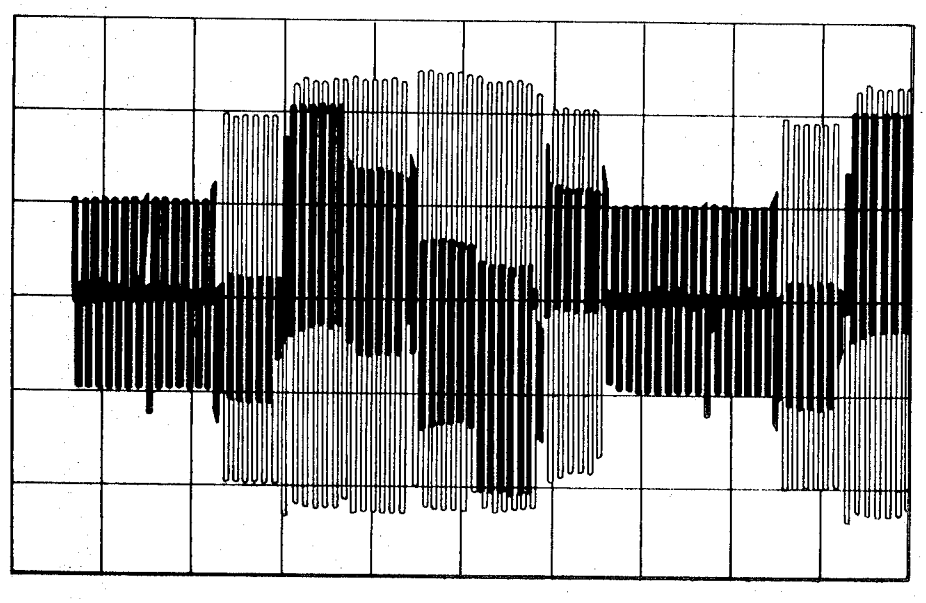
FIG. 9 is a reproduction of an oscilloscope trace illustrating the addition of the waveforms of FIGS. 7 and 8.

The combined chroma plus pilot plus "–I" signal of FIG. 9 modulates the beam intensity of the electron beam recorder 44 whereby the total signal is recorded on the film, still appearing as the spaced vertical lines shown in frame portion 30*b* of FIG. 2 After processing of the film, a release print is made by contact printing which, when played in reproducing apparatus of the type described in the aforesaid application, the chroma pictures are scanned independently of the luminance portion of the frame to derive electrical signals corresponding to the chroma plus pilot plus "–I" signal. The "–I" signal is removed by filtering and the remaining chroma plus pilot applied to a color monitor or to a suitable frequency translator for converting the signals to NTSC standards for broadcast.

THE invention thus provides simple yet highly effective means for improving the quality of color information signals derived from a color motion picture. By simply adding to the composite signal consisting of color difference signals and a pilot signal a signal derived from the output of the camera chain, which fortuitously is of the appropriate polarity and amplitude to equalize the positive and negative excursions of the otherwise unsymmetrical waveform of the chroma plus pilot signals. By thus rendering the chroma plus pilot signal symmetrical, substantially 100 percent of the dynamic range of the film on which the signals are recorded can be utilized, permitting greater modulation of the chroma plus pilot signal and a resulting improvement in signal-to-noise ratio upon playback of the recorded signals.

The specific embodiment described herein is intended to be merely illustrative and it will be understood that modifications in form and detail are possible within the spirit of the invention. For example, the frequencies of the color carrier signal and the pilot signal may differ from those indicated provided, of course, that they be related harmonically in frequency to realize the advantages of the invention. Also, the principle is applicable to recording systems differing in details from the representative embodiment shown in FIG. 1. The invention, therefore, is intended to encompass all such modifications.

I claim:

1. In apparatus for recording on monochrome film having a predetermined dynamic range color information in a scene in the form of two color difference signals suppressed-carrier modulated in quadrature phase to each other on which is superimposed a pilot signal having a frequency one-half that of the carrier, the combination comprising:
- a source of color difference signals "I" and "Q,"
- a source of color carrier signal,
- modulator means to which said color difference signals and said color carrier signal are applied and operative to produce a suppressed carrier signal modulated in quadrature phase with said color difference signals,
- means for adding to said modulated carrier signal a pilot signal having a frequency one-half that of said color carrier signal to produce a composite signal, which composite signal is inherently asymmetrical with respect to an average axis due to the harmonic frequency relationship of said color carrier and pilot signals, and
- means for adding to said composite signal a pedestal signal of such amplitude and polarity as to cause said composite signals to be substantially symmetrical with respect to said average axis to thereby better utilize the dynamic range of said film.

2. Apparatus as defined in claim 1 in which said pedestal signal corresponds to the inverse of a signal representing color information in said scene, and wherein said last-mentioned means comprises an inverter connected between said source of difference signal "I" and the output of said adding means.

3. In apparatus for recording in monochrome on a record medium color picture information in a scene, the combination comprising:
- color television camera means adapted to view the scene to be recorded and operative to provide signals representing luminance information and color difference signals "I" and "Q" representing color information in said scene,
- first and second electron beam recorders operatively associated with said record medium,
- means for applying said luminance information representing signal as modulation to said first recorder for recording an image of luminance information in one area on said record medium,
- modulator means connected to the output of said color television camera means to which said color difference signals are applied and operative to produce a suppressed color carrier signal modulated with said color difference signals,
- means for adding to said modulated carrier signal a reference carrier signal having a frequency one-half that of said color carrier signal to produce a composite signal inherently asymmetrical with respect to an average axis due to the harmonic frequency relationship of said color carrier and reference carrier signals,
- means for adding to said composite signal a pedestal signal having an amplitude and polarity to cause said composite signal to be substantially symmetrical with respect to said average axis to provide a signal for recording, and
- means for applying said signal for recording an image of said signal on another area of said record medium.

4. Apparatus as defined in claim 3 in which said pedestal signal is the inverse of said "I" difference signal.

5. Apparatus as defined in claim 3 wherein said means for adding a pedestal signal to said composite signal comprises an inverter connected from said color television camera means to said adding means operative to apply the inverse of said "I" color difference signal to said adding means.

6. In combination,
- a source of color difference signals "I" and "Q, "
- a source of color carrier signal,
- modulator means to which said color difference signals and said color carrier signals are applied and operative to produce a suppressed carrier signal modulated in quadrature phase with said color difference signals,
- means for adding to said modulated carrier signal a pilot signal having a frequency one-half that of said color carrier signal to produce a composite signal which is inherently asymmetrical with respect to an average axis due to the harmonic frequency relationship of said color carrier and pilot signals,
- and means for adding to said composite signal the inverse of said color difference signal "I" of suitable amplitude to cause said composite signal to be substantially symmetrical with respect to said average axis.

PO-1050
(5/69)

UNITED STATES PATENT OFFICE
CERTIFICATE OF CORRECTION

Patent No. 3,614,302 Dated October 19, 1971

Inventor(s) Abraham A. Goldberg

It is certified that error appears in the above-identified patent and that said Letters Patent are hereby corrected as shown below:

In column 1, line 48, delete the comma (,) after "Hz."; line 51, change "subcarrier" to --sub-carrier--; and line 75, change "subcarrier" to --sub-carrier--.

In column 2, line 7, change "midgray" to --mid-gray--

In column 3, line 17, change "ultrafine" to --ultra-fine--; line 22, change "land" to --and--; line 59, change"ultrafine" to --ultra-fine--; and lines 64-66, delete "and the camera chain 12 likewise is also operating at a rate of 48 frames per second".

In column 4, line 15, insert --,-- after "axis"; line 25, change "midgray" to --mid-gray--; and line 51, insert --%-- after "100".

In column 5, line 20, insert --.-- after "FIG. 2"; line 30 change "THE" to --The--.

In column 6, line 43 insert --as modulation to said second recorder for recording-- after "recording".

Signed and sealed this 2nd day of May 1972.

(SEAL)
Attest:

EDWARD M.FLETCHER,JR.
Attesting Officer

ROBERT GOTTSCHALK
Commissioner of Patents